June 3, 1930. W. POWELL 1,761,895
MERRY-GO-ROUND
Filed Nov. 14, 1927 7 Sheets-Sheet 1

Fig.1.

Inventor:
Wilton Powell,
By John Howard McElroy
his Attorney.

June 3, 1930.  W. POWELL  1,761,895
MERRY-GO-ROUND
Filed Nov. 14, 1927    7 Sheets-Sheet 2

June 3, 1930. W. POWELL 1,761,895
MERRY-GO-ROUND
Filed Nov. 14, 1927 7 Sheets-Sheet 5

Inventor:
William Powell
By John Howard McElroy
his Attorney.

Patented June 3, 1930

1,761,895

UNITED STATES PATENT OFFICE

WILTON POWELL, OF PRESCOTT, ARIZONA

MERRY-GO-ROUND

Application filed November 14, 1927. Serial No. 233,199.

This invention is concerned with amusement apparatus of the type commonly known as merry-go-rounds, and is designed to produce a device of the class described in which the passenger, instead of merely riding around and around in a circle, shall move in different ellipsoidal paths, the relative lengths of the axes of which may be varied, if desired, by changing the relative speeds of the two driving gearings which I employ to secure the desired movement of translation.

To this end I mount a merry-go-round on wheels rolling over a floor, which merry-go-round is simultaneously rotated about its axis as a center, and has its center in turn given a movement of translation in a circle, so that while the merry-go-round as a whole moves in a circle, the individual passengers are moved, as above stated, through different ellipsoidal paths covering different parts of the floor.

It is also concerned with a merry-go-round in which the passengers, instead of having their seats merely raised and lowered as they are translated, as is the common practice, have the seats tilted, preferably at irregular and unexpected intervals, to add a variety to the movements to which they are subjected. To this end, I form the merry-go-round with its peripheral portions separated into sections pivoted by universal joints to the relatively-stationary central portion and having three-point supports, so that each of said sections can tilt when either of the two wheels forming two of the three supports pass over humps placed on the floor wherever they may be desired.

My invention is further concerned with a structure of the type first described in which an electric circuit may be maintained in the merry-go-round proper in spite of the irregular movement of translation to which it is subjected.

My invention is finally concerned with certain novel combinations of elements, which I employ in securig the desired results above enumerated, all as will be described at length, and the novel features thereof pointed out in the claims.
To illustrate my invention, I annex hereto seven sheets of drawings, in which the same reference characters are used to designate identical parts in all the figures, of which.

While my invention may be placed permanently in a building, it is susceptible of being made portable, and in the hereinafter described embodiment of the same, I have illustrated it as designed with that end in view, the broad features of novelty being capable of embodiment in either a permanent or a portable form.

For the portable floor structure, I preferably employ the arrangement shown in Figs. 1 to 4, where the floor proper is shown as made up of segmental sections 20, preferably consisting of two layers 21 and 22 of tongued-and-grooved boards laid crosswise with the central portion where most of the wear comes covered with the sheet-metal surface 23 which forms the track for the caster wheels of the merry-go-round during much of their movement. These three layers are suitably nailed or bolted together and are supported by numerous trestles 24, extending in various directions, and each of which is long enough to support all or a part of a plurality of sections 20, so that when all of the sections 20 are clamped upon the trestles 24, a rigid and generally level floor surface is secured. The trestles may be knockdown, and may have the length of the legs adjustable to accommodate the floor to uneven ground, but such details form no part of my present invention and need not be described. To clamp detachably the sections 20 to the beams of the trestles, I preferably employ the device shown in Figs. 3 and 4, where I form apertures in the metallic reinforcing plates 25 bolted to the boards 22 and 21, and registering with the larger apertures 26 in the boards 21, and in assembling the floor, these apertures are placed adjacent the beams of the trestles 24, so that with the toggle clamp 27 shown in the expanded, dotted-line position of Fig. 4, the upper hook 28 may be caught in the plate 25, while the lower hook 29 is in position to be pulled up and caught in the recess formed in the metal reinforcing plate 25ᵃ bolted to the beam of the trestle 24, when the handle 30 is swung down to the full-line locking position. These toggle clamps are secured to the ends as well as the sides of the beam and will hold the parts securely together, but they can be easily released when the toggle is broken. For the purposes hereinafter described, I preferably make the flooring with an irregular surface and preferably changeable in its irregularity, and for this purpose I provide the sections 20 with the plural series of four recesses 31 adapted to receive the four pins 32 of the humps 33, which will be adjusted in any desired position on the floor.

The base of the merry-go-round proper is preferably constructed as shown in Figs. 1, and 6 to 10, where its central portion or lower wheel is made up of the wooden sweeps or spokes 34 radiating from the center and connected at their outer ends by the tie beams 35, to which they may be secured by the hinge plate 36 (see Fig. 16) bolted thereto, and from which they may be quickly detached for knockdown purposes by withdrawing the hinge pins 37. The inner ends of the spokes are secured in the hub portion of what is virtually a horizontal wheel by the novel connections shown more especially in Figs. 7 to 12, where it will be seen that the tapered ends of the spokes 34 have the recesses 38 cut therein and filled by the metallic plates 39, which are held in place by the rivets 40 passed through the registering holes formed in the spokes and plates. The spoke has the large hole 41 extending therethrough and adapted to receive the lug 42 projecting upwardly from the upper surface of the bottom hub disk 43, and the similar lug 44 projecting downwardly from the under surface of the top hub disk 45. The bottom hub disk 43 has the upwardly extending flanges 46 forming recesses in which the upper ends of the spokes 34 fit snugly and are held in place by the action of the lugs 42 and 44 when the two disks 43 and 45 are rigidly secured together by the bolts 47 passing therethrough in the space between the spokes. This structure permits of the easy dismantling of the wheel into pieces that can be easily handled when it is desired to transfer the merry-go-round to a new location.

Figure 1:
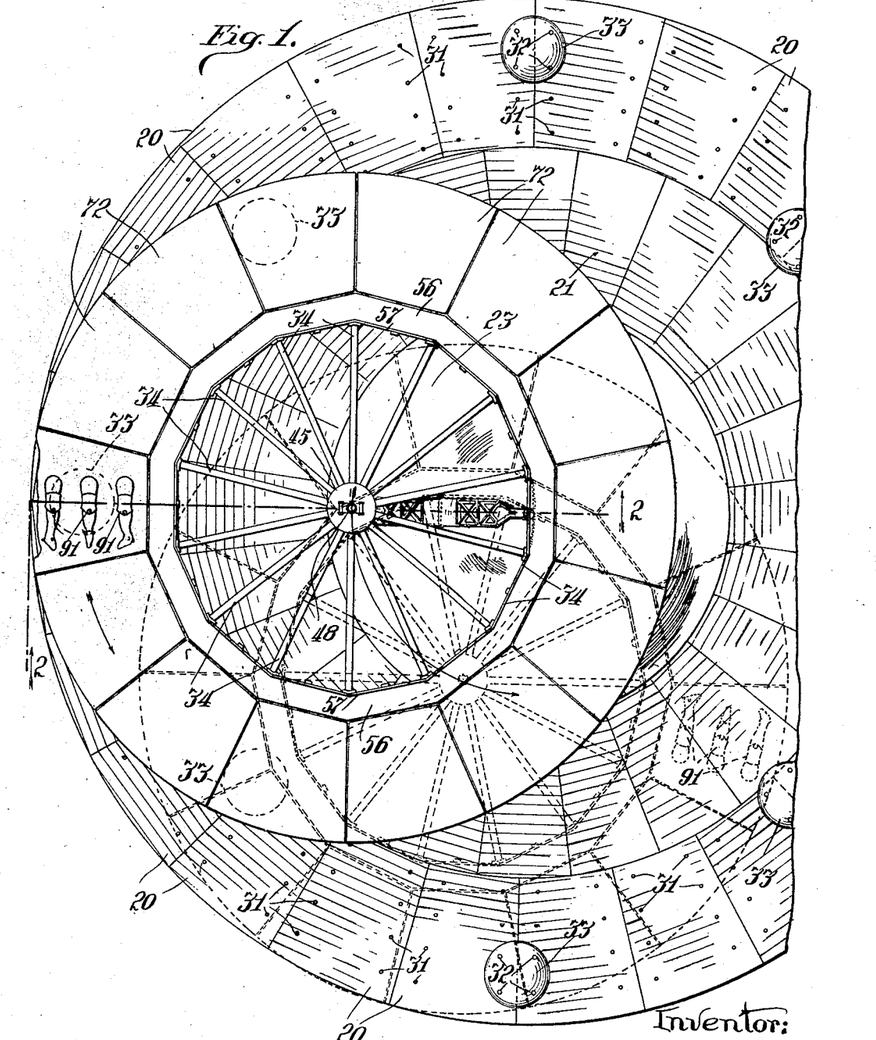
Fig. 1 is a top plan view, partly in section, on the line 1—1 of Fig. 2, showing a portion of the complete apparatus.
Figures 2, 3, 4:
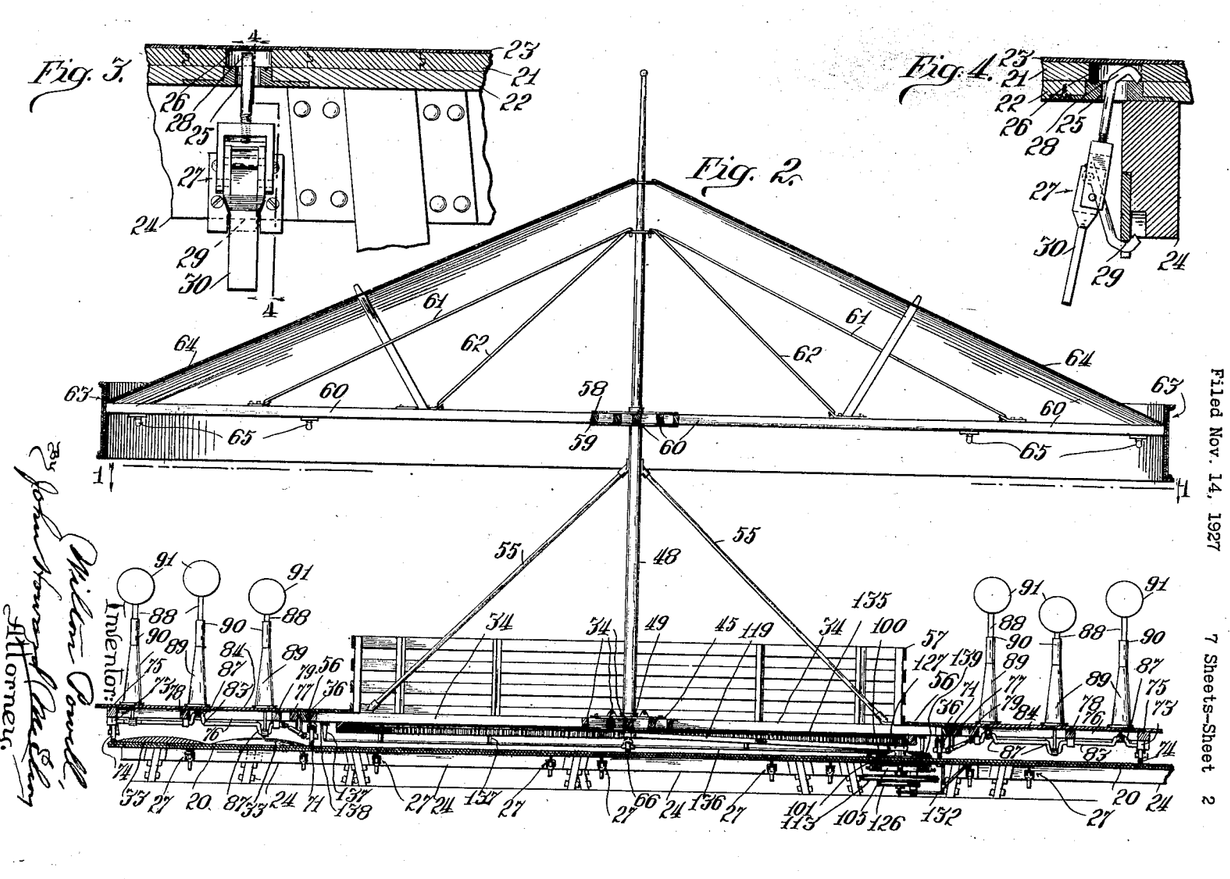
Fig. 2 is a vertical section of a portion of said apparatus, as seen on the line 2—2 of Fig. 1, but on a somewhat larger scale.
Fig. 3 is a detail, partly in section, showing how the temporary floor is quickly secured on the supporting trestles.
Fig. 4 is a view in section on the line 4—4 of Fig. 3.
Figures 7, 8, 9:
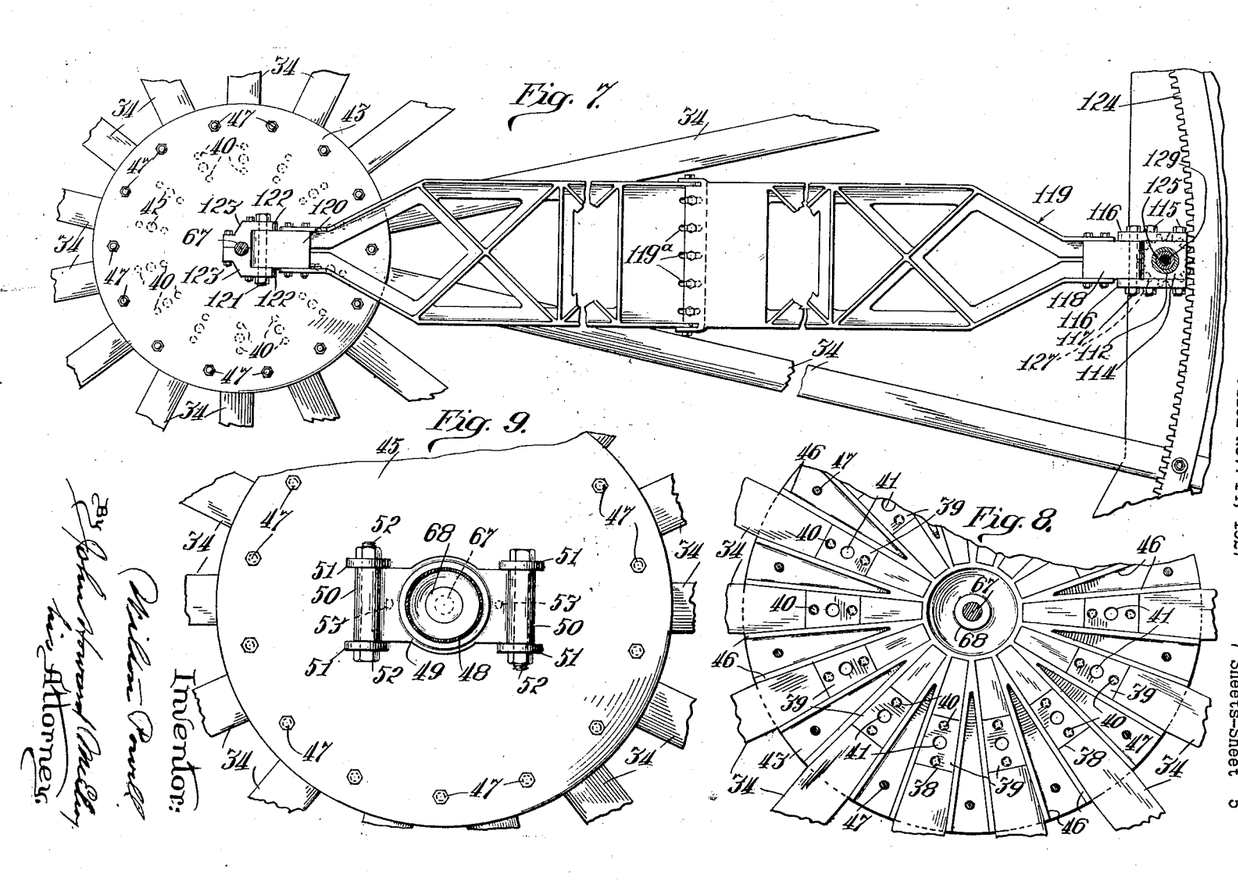
Fig. 7 is an inverted plan view which may be considered as a continuation of Fig. 6, and shows the driving gearing for translating the merry-go-round as a whole through a circle.
Fig. 8 is a plan view of a partion of the center of the merry-go-round, with the upper hub disk removed.
Fig. 9 is a top plan view of the same portion of the structure as is seen in Fig. 8, but with the top hub disk in place;
Figures 10, 11, 12:
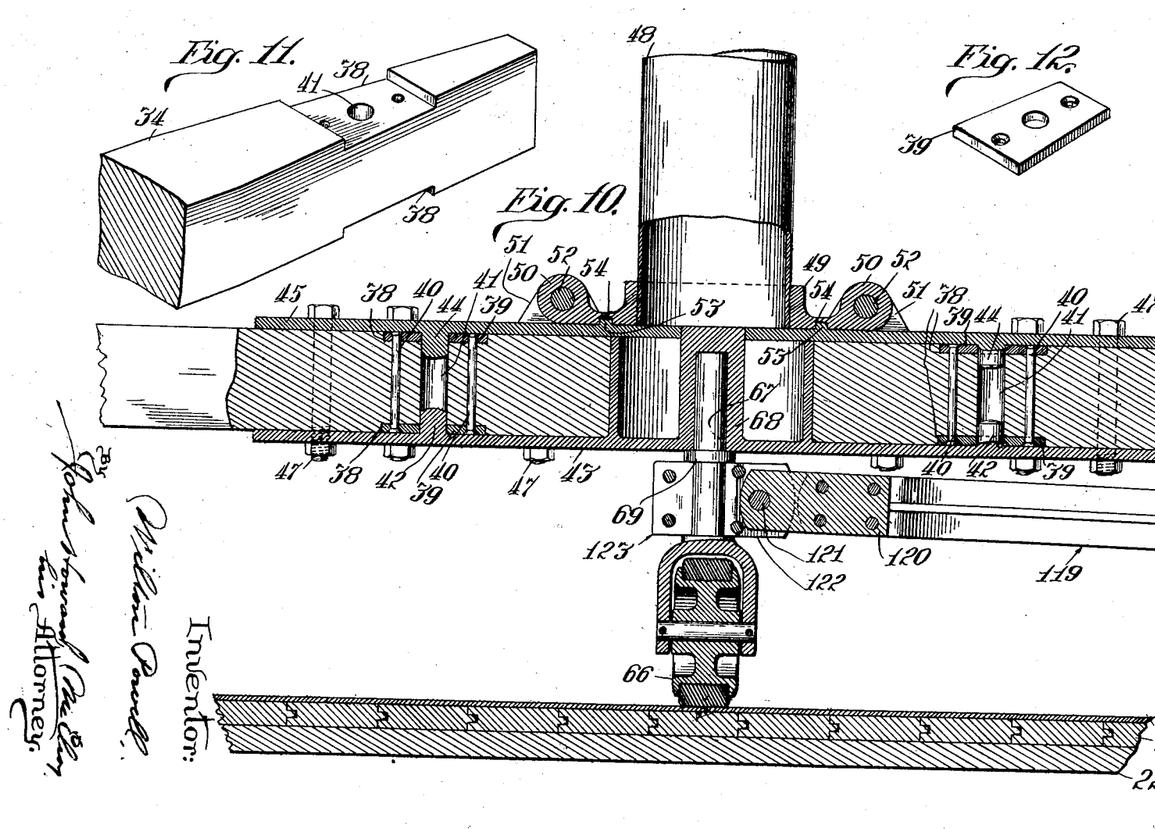
Fig. 10 is a detail in vertical section through the center of the lower portion of the merry-go-round, but on a larger scale.
Fig. 11 is a perspective view of the inner end of one of the spokes of the merry-go-round.
Fig. 12 is a perspective view of one of the plates employed on the spokes.

As seen in Figs. 2, 9 and 10, the hollow center pole 48 is located by having its bottom stepped in the centrally located circular aperture in the casing 49, which has the pair of ears 50 projecting upwardly therefrom and adapted to fit between the two pair of ears 51 projecting upwardly from the upper surface of the top hub disk and adapted to be secured in place by the bolts 52 passing through the ears 50 and 51. As an aid in positioning the ears in assembling, I may provide the lugs 53 projecting upwardly from the upper surface of the top hub disk 45 and fitting in the recesses 54 formed in the under side of the casing 49. The center pole 48 is held in place by the braces 55 suitably secured at their upper ends to the pole 48 and at their lower ends to some of the spokes 34 near the rim of the wheel. The outer portion of the wheel has the floor 56 secured on the ends of the spokes 34, and a knockdown fence 57 is preferably provided just inside of the floor to prevent patrons from accidentally stepping into the skeleton central portion of the wheel. As seen in Fig. 2, the center pole supports a canopy of any suitable construction, which preferably has the upper wheel structure, with similar top and bottom hub disks 58 and 59 or a single casting secured to the center pole positioning and supporting the inner ends of the top spokes 60, the outer ends of which are supported by the two sets of rods 61 and 62 in a manner which will be readily understood from the drawings. A cornice 63 for pictures or advertising will be provided at the ends of the spokes 60, and a canvas top 64 will be supported in any desired manner. For illumination, I preferably provide the incandescent lights 65 secured on the under side of each of the upper spokes 60, and all around the inner side of the cornice 63, and I provide for a circuit cooperating therewith in all positions of the merry-go-round by the electrical connections to be hereinafter described.

Figures 13, 14, 15, 16:
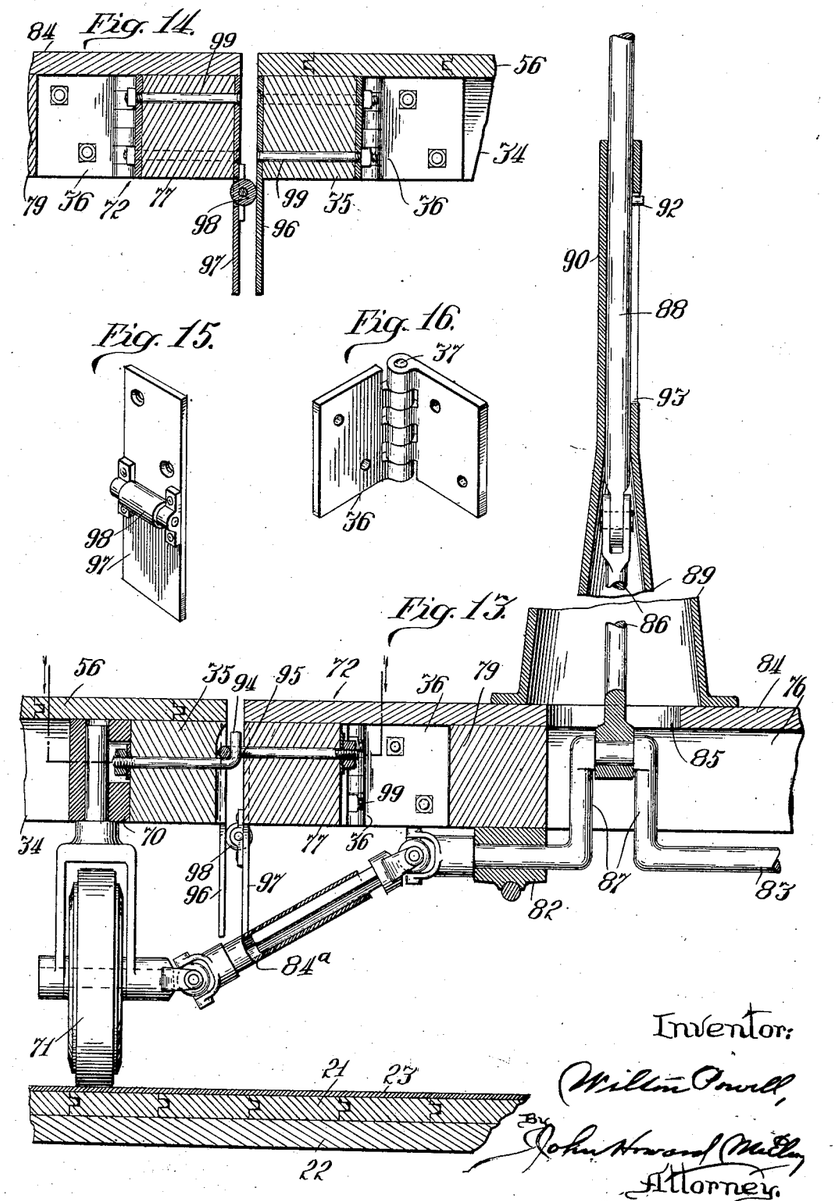
Fig. 13 is a central vertical section, on the same scale as Fig. 10, showing the connections between the inner, relatively-stationary portion of the merry-go-round and the tilting sections at its periphery.
Fig. 14 is an enlarged detail in section on the line 14—14 of Fig. 6;
Fig. 15 is a perspective view of one of the bearing plates seen in Fig. 14.
Fig. 16 is a similar view of one of the hinge connections likewise seen in said Fig. 14.

To support the merry-go-round, and to enable it to travel with little resistance over the floor, I employ a number of anti-friction wheels which take the form of caster wheels, so that they can assume any angle that may be necessary in the peculiar and varying movements to the various parts of the merry-go-round to which they are attached. The central wheel 66 (see Fig. 10) has the upper end of its fork 67 journaled in a bearing 68 formed in the center of the bottom hub disk 43, it preferably being provided with the collar or flange 69 engaging the bottom of the bearing. Journaled in a suitable bearing 70 (see Fig. 13) secured at the center on the inner side of each of the tie beams 35 is the fork of the caster wheel 71, and near the two outer corners of each of the segmental peripheral portions 72 of the merry-go-round is secured the bearing 73 for the fork of the caster wheel 74 (see Fig. 6), the bearings 73 being preferably secured on the inner face of the outer tie or frame beam 75, which is connected by the hinge plates 36 to the radial beams 76, which at their inner ends are similarly connected to the inner tie beams 77. Additional tie beams 78 and 79, intermediately located and similarly secured, are employed to give additional strength to the sectional frames 72 and to furnish supports for the bearings 80, 81 and 82 of the crank shaft 83 journaled therein and connected by the telescoping universal joint 84ª with the shaft of the wheel 71, so that as the latter rolls over the floor 20 the crank shaft 83 will be rotated. The beams 75, 76, 77, 78 and 79 have the flooring boards 84 secured thereon, which flooring is provided with the plurality of apertures 85, through which extend the links 86 journaled at their lower ends on the cranks 87 and having their upper ends pivoted to the vertical actuating rods 88 extending up through the hollow metal standards 89, preferably detachably secured to the floor 84 and having their upper ends 90 reduced to a tubular form to furnish a substantial close-fitting bearing for the rods 88, which have the seats 91 (which may take the form of horses or other animals) removably secured thereon so that they cannot rotate on the rods 88, which in turn are prevented from any tendency to rotate by the pin 92 projecting therefrom and engaging the elongated, longitudinally-extending, vertical slot 93 in the upper end 90 of the standard 89. To secure the outer sections 72 to the central portion, I employ the connections best shown in Fig. 13, where it will be seen that I secure in the center of the tie beam 35 a hook bolt 94, the upwardly-extending engaging end of which enters the eye of the bolt 95, similarly located in the beam 77, so that the outer section is free to tilt in any direction relative to the central frame or wheel. As there would otherwise be considerable friction between the center part and the outer sections, I place between the beams 35 and 77, near their ends, and between the beams 76 near their outer ends (and possibly elsewhere), the anti-friction plates 96 and 97, preferably journaling an anti-friction roller 98 on the plate 97, as best seen in Fig. 15. The plates 96 and 97 are secured at their upper ends in recesses cut in the supporting beams 35, 76 and 77 by the bolts 99 having their heads countersunk in the plates. It will be obvious that these plates and anti-friction rollers will materially reduce the friction, as well as the noise, which would otherwise result from the tilting or relative movement of the outer sections 72.

Figure 5:
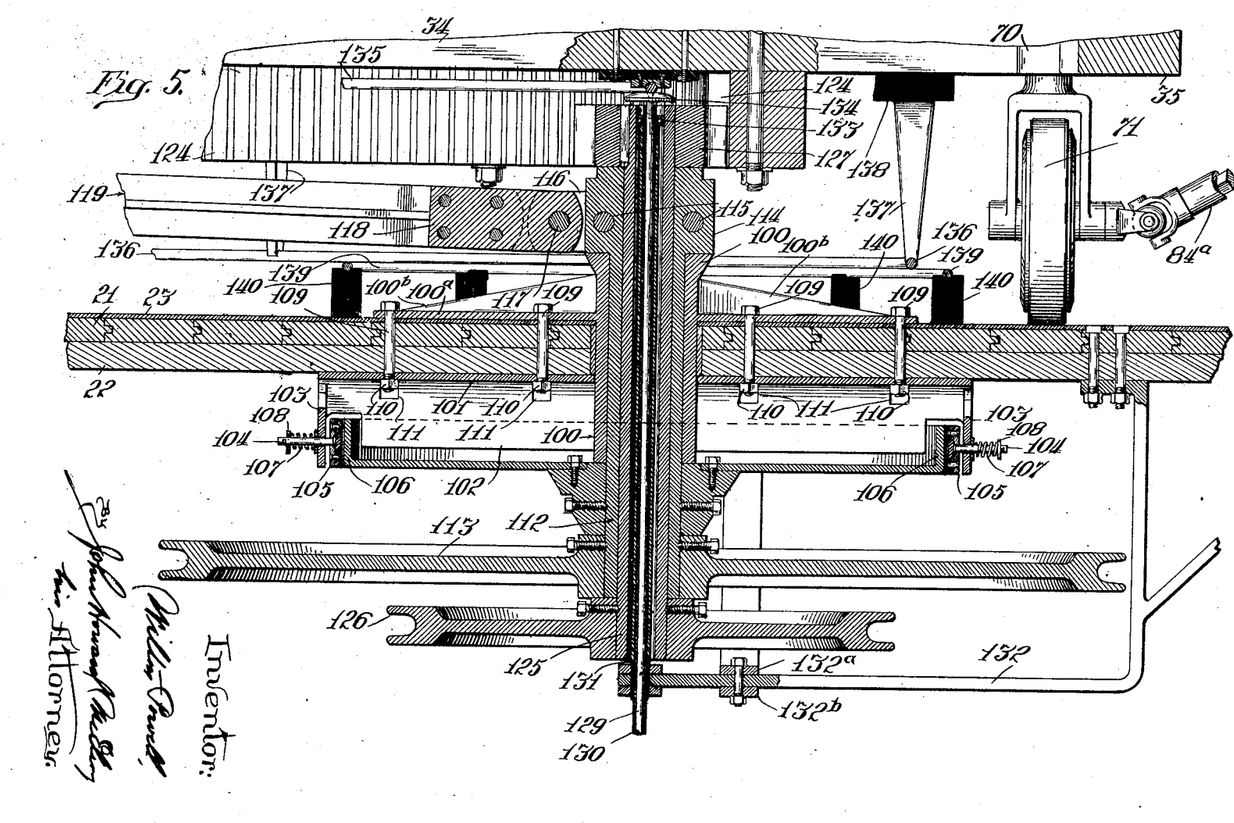
Fig. 5 is a central vertical section, on a much enlarged scale, through the driving gearing located at the center of the floor.
Figure 6:
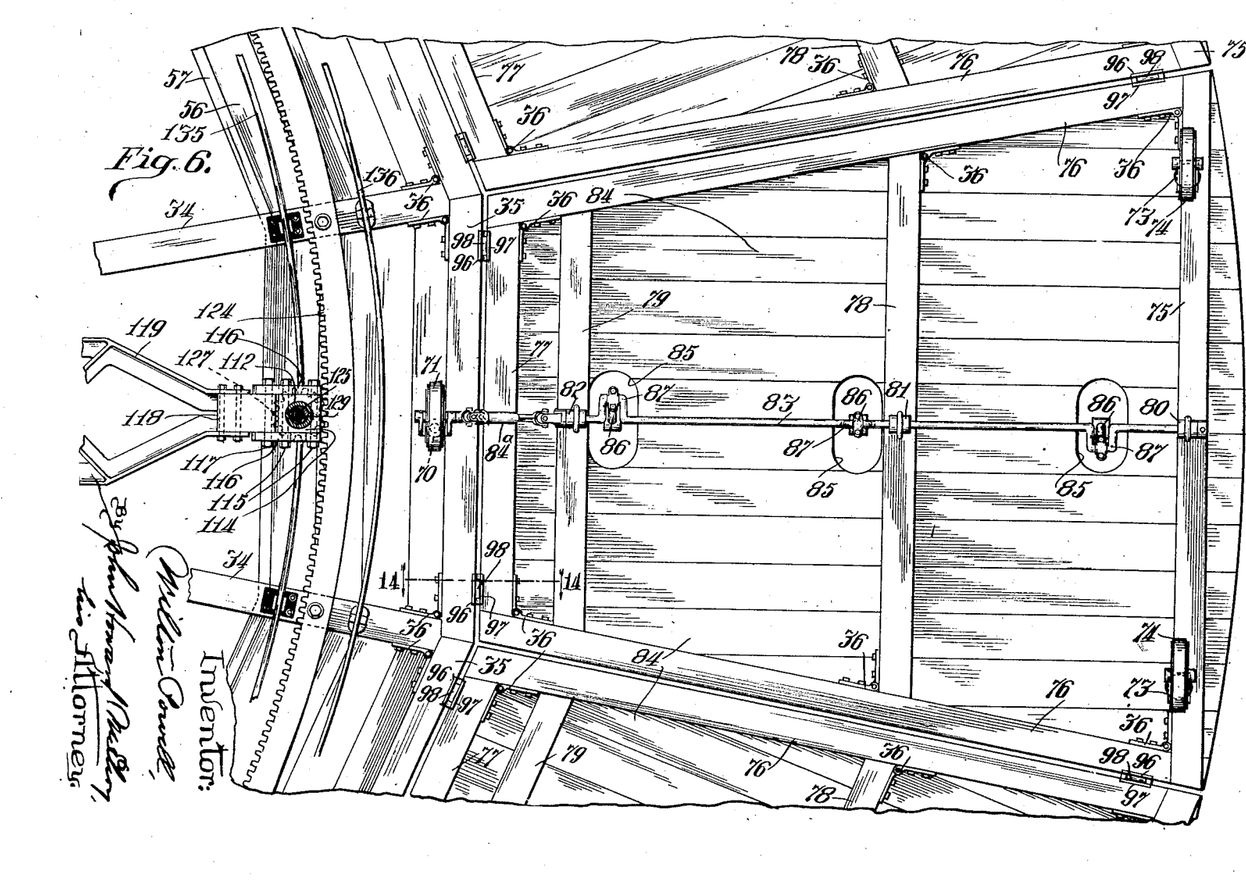
Fig. 6 is an inverted plan view of an outer portion of the merry-go-round, showing one of the tilting sections and its connections;

It remains now to describe the gearing by which the merry-go-round is driven, and I preferably employ the form best illustrated in Figs. 5 to 7, where it will be seen that I secure in the center of the floor a vertical bearing sleeve 100, which may have cast integral therewith the disk 100ª having on its upper surface the radially extending ribs 100ᵇ. Beneath the floor is the disk 101 having the downwardly-extending radial ribs 102 supporting at their outer ends the annulus 103, through apertures in which extend the supporting pins 104 of the customary brake band 105, which is normally held out of contact with the periphery of the brake disk 106 by the helically-coiled expanding springs 107 interposed between the washers 108 on the outer ends of the pins 104 and the annulus 103. The customary brake lever (not shown) will be provided to tighten the brake band 105 on the disk 106 to stop the merry-go-round when the power has been shut off. The two disks 100ª and 101 are bolted to the floor by the bolts 109 passed through them and the floor, the nuts 110 of which may be held in the recesses 111 formed for that purpose in the ribs 102. Journaled in the bearing sleeve 100 is the hollow shaft 112 having the drive wheel 113 secured on its lower end, and the enlarged rectangular upper end 114 resting and turning on the top of the sleeve 100. The brake disk 106 is also secured to this hollow shaft. As seen in Figs. 5, 6 and 7, the upper end of the shaft 112 has clamped thereon by the bolts 115 the bars or pieces 116, the outer ends of which form a pair of ears between which is pivoted, by the bolt 117, the block 118 bolted in and forming the end of the truss beam or arm 119, best seen in Fig. 7. This arm 119 is preferably cast in two or more sections bolted together, through the slots 119ª so it can be properly adjusted to secure proper meshing of the spur gear pinion 127 with the rack 124 hereinafter described. The outer end of the beam 119 has bolted thereon the block 120, which is pivoted by the bolt 121 between the ears 122 forming a part of the split bearing block 123, which forms a journal bearing for the pintle of the forks 67 of the wheel 66 below the collar 69 (see Fig. 10). Consequently, the slow swinging of the arm 119 due to the rotation of the shaft 112 will cause the merry-go-round as a whole to revolve about the shaft 112 as a center, the various caster wheels 66, 71 and 74 trailing so that their axles will always be at right angles to their line of movement.

Bolted on the under sides of the sweeps or spokes 34 near their outer ends is a circular rack 124, which is preferably made in sections, for ease of transportation when dismantled. Journaled inside of the hollow shaft 112 is a preferably hollow shaft 125 having the driving wheel 126 secured on its lower end, and having the spur gear pinion 127 meshing with the rack 124 secured on its upper end. Obviously, as the shaft 125 is rotated, the merry-go-round proper will be rotated about its center as an axis.

Owing to the peculiar movement of the merry-go-round over the floor, the electrical connections for the lamps 65 cannot be maintained by ordinary means, and to furnish contacts for a complete circuit, I place in the hollow shaft 125 a conductor rod 129 protected by insulation 130, and preferably enclosed in a tube 131, the lower end of which is secured in and supported by the bracket 132 secured to the under side of the floor. This bracket 132 is reinforced by the two similar brackets 132ª and 132ᵇ extending at right angles thereto, the bracket 132ᵇ being seen only in cross section in Fig. 5. One or more roller bearings 133 may be interposed between the tube 131 and the hollow shaft 125. The upper end of the rod 129 is enlarged to form a contact disk 134, which is always engaged by some portion of a concentric, circular conductor-rod 135 supported and insulated from the under side of the sweeps or spokes 34 in the manner clearly shown in Fig. 5. A lead or leads (not shown) may be taken from any point of the conductor ring 135 to form the necessary circuit or circuits for the lamps 65, and the return lead or leads (not shown) will be connected to the slightly larger contact ring 136 supported by the arms 137 from the insulation blocks 138, which in turn are secured to the under side of the spokes 34. Some portion of this contact ring 136 will always engage the smaller contact ring 139 concentric with the driving shafts for and supported by the blocks 140 of insulating material secured upon the floor. The return line (not shown) will be taken from the ring 139, so that by connecting the rod 129 and the ring 139 with the positive and negative mains, a circuit can always be maintained through any electrical apparatus carried by the merry-go-round no matter what its position on the floor may be.

The operation of my improved merry-go-round will now be readily apparent. Where the drive wheels 113 and 126 are rope pulleys, as shown, two electric motors or other circuits of variable speed will be located outside of the platform and connected by ropes or cables with the wheels 113 and 126. Where the installation is permanent, the shafts 112 and 125 will be extended through the floor of the building to a basement, where they may be connected by any suitable gearing with the two motors.

In starting up, the power is first turned on to the spur gear pinion and the rotation of the merry-go-round is started, and when it is up to, say, half speed, power is applied to the arm 119 to give the merry-go-round its movement of translation. When that has attained half speed, the speed of the spur gear may be increased, and the relative speeds varied as desired to give the kind of a ride that will be most enjoyable to the patrons. It will, of course, be understood that the lower the relative speed of the spur gear, the longer the axes of the ellipsoidal paths, and vice versa. It will also be apparent that the speed of the movement of the individual patrons will vary at different places in the ellipsoidal paths, and that it will be greatest in the outer portion of the ellipse if the shafts 112 and 125 are rotated in the same direction, and least in said outer portion if they are rotated in opposite directions. By thus varying the relative speeds and directions of rotation of the two shafts 112 and 125, interesting variations in the ride may be obtained even if the humps 33 are not employed. Where they are employed, however, as the wheels 74 of the section 72 having the three-point suspension ride over the humps, the rider's seat will be tilted first backward and then forward, if both wheels pass over the same hump, which will not always be the case, as with the same relative speeds some of the humps will catch only one wheel 74 on each section 72. The rocking effect will be varied without changing the position of the humps by varying the relative speeds and directions of the shafts 112 and 125, and still greater variations may be secured by changing the location of the humps, which will ordinarily be staggered, as shown. As the humps are not visible to the riders, the tilting action will always be unexpected, and add that element of enjoyment to the ride.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I do claim, and desire to secure by Letters Patent of the United States, is:

1. In an amusement device, the combination with a floor, of a merry-go-round having a relatively fixed central portion and hinged outer sections movable over the floor, means for simultaneously rotating said merry-go-round on its vertical axis and translating it bodily over the floor and humps on the floor to tilt the hinged sections at different times in different rotations.

2. In an amusement device, the combination with a floor, of a rotatable merry-go-round made up of a central portion and outer hinged sections, gearing for simultaneously rotating said merry-go-round on its vertical axis and translating it bodily over the floor, and humps on the floor to tilt the hinged sections at different times in different rotations.

3. In an amusement device, the combination with a floor, of a merry-go-round having a circular rack concentric therewith, anti-friction devices between the merry-go-round and the floor, a driving pinion journaled in a bearing stationary relative to the floor and meshing with the rack, an arm pivotally connected at one end with the center of the merry-go-round and at the other with the bearing for the driving pinion, and means for swinging the arm and rotating the pinion.

4. In an amusement device, the combination with a floor, of a merry-go-round mounted to rotate thereover and composed of a central portion and pivoted outer sections, ground wheels carried by said central portion and pivoted outer sections and rolling over the floor, a crank shaft on each pivoted section connected to a ground wheel carried by the central portion, vertically reciprocable seats for the merry-go-round, vertically reciprocating rods connected to the seats at their upper ends and to the cranks of the shafts at their lower ends, humps on the floor, and extensible universal-joint sections between said crank shafts and the ground wheels to which they are connected.

5. In an amusement device, the combination with a flooring, of a merry-go-round having a circular rack concentric therewith, anti-friction devices between the merry-go-round and the flooring, a central vertical shaft journaled in the flooring and having a pinion on the its upper end meshing with the circular rack, a hollow shaft surrounding the central shaft, an arm pivoted to the hollow shaft at one end and to the center of the merry-go-round at the other end, and means at their lower ends for rotating said shafts.

6. In an amusement device, the combination with a sectional floor, of a rotatable merry-go-round, gearing for simultaneously rotating said merry-go-round about its vertical axis and translating it bodily over the floor, trestles to support said floor longer than the sections thereof, and means for temporarily connecting said trestles each to a plurality of the floor sections.

7. In an amusement device, the combination with a floor having an irregular surface, of a merry-go-round adapted to be rotated on its vertical axis and also to be moved bodily over the floor and composed of a central part and radially-extending rigid segments constituting the outer part pivotally secured by universal joints at the center of their inner ends and having supporting wheels at their two outer corners, and means for moving and rotating the merry-go-round.

8. In an amusement device, the combination with a floor, of a merry-go-round adapted to move thereover, said merry-go-round being composed of a central part and radially-extending segments constituting the outer part pivoted to the central part so that the outer ends of the segments may rise and fall, vertically-extending anti-friction bearing plates interposed between the segments and adjacent relatively movable parts, and means for moving the merry-go-round.

9. In an amusement device, the combination with a floor, of a merry-go-round having a circular rack concentric therewith, anti-friction devices between the merry-go-round and the floor, a hollow driving shaft journaled in the floor having an arm pivotally connected at one end with the center of the merry-go-round, a second hollow shaft inside of the first having a pinion meshing with the circular rack, means for rotating said driving shafts, a vertical electrical contact member extending up through the inner shaft and terminating in a circular contact, an annular contact within the circular rack carried by the merry-go-round and engaging the upper end of the vertical contact member, another annular contact member outside of the rack bar, and a third annular contact member surrounding the bearing and engaging the outer annular contact member carried by the merry-go-round.

10. In an amusement device, the combination with a floor, of a merry-go-round movable thereover and having wheels that move thereover in variable paths, substantially circular humps beveled on all angles on the floor to tilt the merry-go-round, and means for changing the location of the humps.

11. In an amusement device, the combination with a floor having substantially circular humps located thereon at various places, of a merry-go-round mounted thereon having vertically movable sections, gearing to rotate said merry-go-round about its vertical axis and to swing said vertical axis in a circle about a stationary axis at the center of the floor, and rolling supports extending from the vertically movable sections to the floor so that the humps when encountered by the supports approaching them from any angle will lift the supports.

12. In an amusement device, the combination with a floor having substantially circular humps located thereon at various places, of a merry-go-round mounted thereon having vertically movable sections, gearing to rotate said merry-go-round about its vertical axis and to swing said vertical axis in a circle about a stationary axis at the center of the floor, the diametrically opposite vertically movable sections always having the stationary axis between them, and rolling supports extending from the vertically movable sections to the floor so that the humps when encountered by the supports approaching them from any angle will lift the supports.

13. In an amusement device, the combination with a merry-go-round, of means for translating it bodily and simultaneously rotating it, a plurality of passenger-supporting sections movable up and down relative to the main central portion thereof and located toward its periphery, a support over which the merry-go-round is translated, and substantially circular humps located on said support to lift said sections when contacted thereby.

In witness whereof, I have hereunto set my hand this 7th day of November, 1927.

WILTON POWELL.